Patented Apr. 14, 1953

2,635,036

UNITED STATES PATENT OFFICE 2,635,036

TREATMENT OF TITANIFEROUS MATERIAL

Jack A. Rogers, Freeland, Mich., assignor to The Dow Chemical Company, Midland, Mich., a corporation of Delaware No Drawing. Application August 23, 1951, Serial No. 243,380

11 Claims. (Cl. 23—87)

The invention relates to the treatment of titaniferous material. It more particularly concerns an improved treatment of titanium-bearing ores, e. g. rutile and ilmenite, or concentrates, so as to prepare them for chlorination with chlorine gas to yield titanium tetrachloride.

In preparing titaniferous ores for treatment with chlorine gas to yield titanium tetrachloride, procedures heretofore proposed involve preparing a briquette of a mixture of the ore and a reducing agent of carbonaceous material. In these procedures among the objectives sought is a mechanically strong briquette, which is able to resist the tendency to be crushed under its own accumulated weight in the reduction operation, while possessing adequate porosity to permit penetration of the chlorine gas. A method proposed for achieving this objective consists in mixing with the ore and carbonaceous material a small amount of an alkali metal hydroxide, e. g. sodium hydroxide. The mixture is sintered by heating at a temperature of from 400° C. to 1000° C. under non-oxidizing conditions to produce a product of good porosity and excellent structural strength.

It has now been discovered that the preparation of the titaniferous ores for chlorination can be effected without the need for either a sintering operation or the use of non-oxidizing conditions or briquetting if instead of using an alkali metal hydroxide in aqueous solution in the mixture of ore and carbonaceous reducing material there be used an aqueous solution of an alkali metal carbonate, e. g. sodium carbonate. The resulting mixture, unlike those heretofore proposed, dries rapidly at relatively low temperature, e. g. 100° to 200° C. on being directly contacted with a current of heated air, forming a friable cake which, without further treatment, may be treated with hot chlorine to give a high yield of titanium tetrachloride. Another advantageous result is that the solid residue invariably formed in the chloridizing operation does not fuse into slag or clinker, which is difficult to remove from the reactor in which chlorination takes place, but forms instead a pulverulent residue which is easily removed from the reactor.

The invention then consists of the improved method of preparing a titaniferous ore for chlorination hereinafter fully described and particularly pointed out in the claims.

In carrying out the invention, the titaniferous ore is used in a finely pulverized condition. A desirable fineness is one in which the particles of the ore will pass through a No. 200 sieve. The solid carbonaceous reducing agent to be used is also finely pulverized, preferably fine enough to pass through a No. 100 sieve. Various solid carbonaceous materials may be used for the reducing agent such as coal and coke. A preferred reducing agent is petroleum coke finely ground. The titaniferous ore and solid reducing agent are intimately mixed as in a muller or pug mill along with the sodium carbonate preferably dissolved in water. If desired, the solid ingredients may be mixed dry and then enough water to dissolve the sodium carbonate may be added and mixed with the dry mixture to form a uniform mixture of the solids with the resulting sodium carbonate solution. The carbonaceous reducing agent is used in amount preferably slightly in excess of that sufficient to reduce the oxide in the ore to metal as understood in the art. For example, in the case of rutile suitable proportions are about 28 parts by weight of carbon, as petroleum coke, and 72 per cent of rutile; for ilmenite (comprising 65 per cent $TiO_2$ and 35 per cent $FeO$) about 27 parts of carbon is required per 100 parts of ilmenite. These proportions are slightly in excess (e. g. 5 per cent) of those corresponding to the stoichiometric relationship between the carbon of the reducing agent and the oxide of the titaniferous ore. The amount of alkali metal carbonate which produces desirable results is about 1 to 10 per cent of the weight of the mixture of ore and solid carbonaceous reducing agent. A preferred proportion of the alkali metal carbonate is about 3 per cent. The amount of water used does not appear to be sharply critical. A desirable amount of water is that permitting the formation of a mixture which cakes like foundry molding sand when a handful is squeezed. An amount of water equal to about 10 times the weight of the alkali metal carbonate is satisfactory, although other proportions may be used.

After the ore, reducing agent, and alkali metal carbonate solution have been thoroughly mixed together, the resulting mixture is dried preferably in the form of a cake. The cake may be formed in any suitable manner as by spreading out the moist mixture in shallow pans and compacting the mixture, as by troweling, to form a layer of say 1 to 2 inches in depth. If desired, the moist mixture may be die-expressed into slabs 1 to 2 inches thick. The caked material is dried in an air current heated to from about 100° C. to 200° C.; preferable drying temperatures are about 150° C. to 160° C. Drying is continued until the moisture in the cake is evaporated leaving a dried caked mass. At 125° C., drying is substantially complete in about 4 hours; at 150° C. drying is complete in 1.5 hours with thin cakes, e. g. ¼ inch thick. The dried mass is friable and porous. It may be fragmented easily and it chlorinates very readily with hot chlorine, without further treatment, to give a high yield titanium tetrachloride with a high efficiency of utilization of the chlorine.

The following examples are illustrative of the practice of the invention:

Example 1

Finely ground rutile (90 per cent by weight passing through a No. 325 sieve), comprising 95 per cent $TiO_2$, 1.24 per cent $ZrO_2$, 1.38 per cent $Fe_2O_3$, the balance being other impurities, was mixed in a muller with finely-divided petroleum coke (50 per cent by weight passing through a No. 325 sieve, the balance passing through a No. 100 sieve) in the proportions by weight of 72 parts of the rutile to 28 parts of the petroleum coke along with 3 parts of $Na_2CO_3$ and 30 parts of water. The mixture was spread out in a pan and troweled into a slab about 1.5 inch thick. Air heated to from 100° to 115° C. was passed over the slab for about 6 hours during which the slab dried to substantially constant weight. The dried slab was friable. It was broken into small pieces and charged into a tubular reactor having an inside diameter of 1.75 inches. Measured amounts of chlorine were passed into the bottom of the charge in the reactor which was initially heated with gas flames to about 500° C. to initiate the chlorination reaction which ensued and continued thereafter with some external heating. The vapors resulting from the reaction were discharged from the top of the reactor and subjected to cooling to condense the titanium tetrachloride thereby produced. During the reaction, while the titanium tetrachloride was being evolved, the charge diminished in volume and from time to time additional amounts of the fragmented dried slab were added to the charge until a total of 2790 grams had been introduced into the tubular reactor over a period of 2.5 hours. At all times during the introduction of the chlorine into the tubular reactor, the particles of the charge remained free flowing, thereby allowing the chlorine free access to the material to be chlorinated. A small amount of dust-like residue was left after all the titaniferous material introduced into the tubular reactor was chlorinated. The $TiCl_4$ obtained contained 90 per cent of the titanium of the titaniferous material introduced into the charge. The rate of $TiCl_4$ production averaged 3.66 pounds per hour. The percent efficiency of the chlorine utilization was 85.6 per cent.

Example 2

In this example, the procedure followed was similar to that of Example 1 using the same titaniferous ore and reducing material in the same proportions with the exception that 2 parts of $Na_2CO_3$ by weight were used instead of 3. The weight of the slab charged into the reactor was 5340 grams and the duration of the run was 5.33 hours. The per cent of the titanium recovered as titanium tetrachloride was 88.6 per cent, the average rate of $TiCl_4$ production being 3.66 pounds per hour. The percent efficiency of the utilization of the chlorine was 79.3 per cent.

Example 3

In this example, the procedure followed was similar to that of Example 1 using the same titaniferous ore and reducing material with the exception that 5 parts of $Na_2CO_3$ by weight were used instead of 3. The weight of the slab charged into the reactor was 2040 grams and the duration of the run was 2.08 hours. The per cent of the titanium recovered as titanium tetrachloride was 92.7 per cent, the average rate of $TiCl_4$ production being 3.24 pounds per hour. The per cent efficiency of the chlorine utilization was 67.7 per cent.

An analysis of a composite sample of the titanium tetrachloride obtained from a number of similar sized runs including those of the foregoing examples and carried out in similar manner showed that a high grade product was obtained, the main impurities present being as follows: Al, 0.009%; Ca, <0.001%; Cu, <0.05%; Fe, <0.003%; Mg, <0.0005%; Mn, <0.0003%; Si, 0.025%; V, 0.025%; and Zr, <0.005%.

Among the advantages of the invention is that no binding agent need be used other than the sodium carbonate solution. Low temperature drying suffices to prepare a cake for chlorination. The cake dries rapidly. The residue after chlorination is a free-flowing powder rather than a slag or clinker. Drying in direct contact with air precludes the necessity for using non-oxidizing conditions in the preparation of the ore for chlorination. The cake prepared as described yields a high proportion of its titanium as titanium tetrachloride with a high efficiency of utilization of chlorine.

I claim:

1. In the method of preparing a titaniferous ore for treatment with chlorine gas to produce titanium tetrachloride in which the ore is mixed with a solid carbonaceous reducing agent the improvement which consists in incorporating in the mixture of the titaniferous ore and the solid carbonaceous reducing agent an aqueous solution of an alkali metal carbonate and drying the resulting mixture.

2. The improvement according to claim 1 in which the alkali metal carbonate is sodium carbonate.

3. The improvement according to claim 1 in which the titaniferous ore is rutile.

4. The improvement according to claim 1 in which the titaniferous ore is ilmenite.

5. The method of preparing a titaniferous ore for treatment with chlorine gas to produce titanium tetrachloride which comprises forming a mixture comprising finely-divided titaniferous ore, a finely-divided solid carbonaceous reducing agent having a carbon content in excess of that corresponding to the stoichiometrical equivalent of the oxides in the ore, sodium carbonate, and water in amount sufficient to dissolve the sodium carbonate, and subjecting the resulting mixture to drying in a current of heated air having a temperature not in excess of 200° C.

6. The method according to claim 5 in which the amount of sodium carbonate is about 1 to 10 per cent of the combined weight of the ore and reducing agent.

7. The method according to claim 5 in which the amount of sodium carbonate is about 1 to 10 per cent of the combined weight of the ore and reducing agent and the ore is rutile.

8. The method according to claim 5 in which the amount of sodium carbonate is about 1 to 10 per cent of the combined weight of the ore and reducing agent and the ore is ilmenite.

9. The method of preparing a titaniferous ore for treatment with chlorine to produce titanium tetrachloride which comprises mixing together the titaniferous ore in finely-divided form a solid carbonaceous reducing agent in finely-divided form and an aqueous solution of an alkali metal carbonate so as to form a moldable mixture, spreading out the so-obtained mixture into a layer about 0.25 to 2 inches thick, and subjecting the layer to the drying action of air heated to a temperature between 100° and 200° C., whereby a porous friable dried cake is obtained.

10. The method according to claim 9 in which the alkali metal carbonate is sodium carbonate.

11. The method of making titanium tetrachloride which comprises forming a mixture comprising a finely-divided reducible titaniferous ore a finely-divided solid carbonaceous reducing agent, sodium carbonate and water, subjecting the resulting mixture to the drying action of air heated to a temperature between 100° and 200° C., and reacting the resulting dried mixture with chlorine gas at elevated temperature to produce titanium tetrachloride.

JACK A. ROGERS.

References Cited in the file of this patent

UNITED STATES PATENTS

| Number | Name | Date |
|---|---|---|
| 2,479,904 | Cole | Aug. 23, 1949 |

OTHER REFERENCES

"Titanium," by W. M. Thornton, 1927 ed., page 62. The Chemical Catalog Co., Inc., N. Y.